Figure 1:
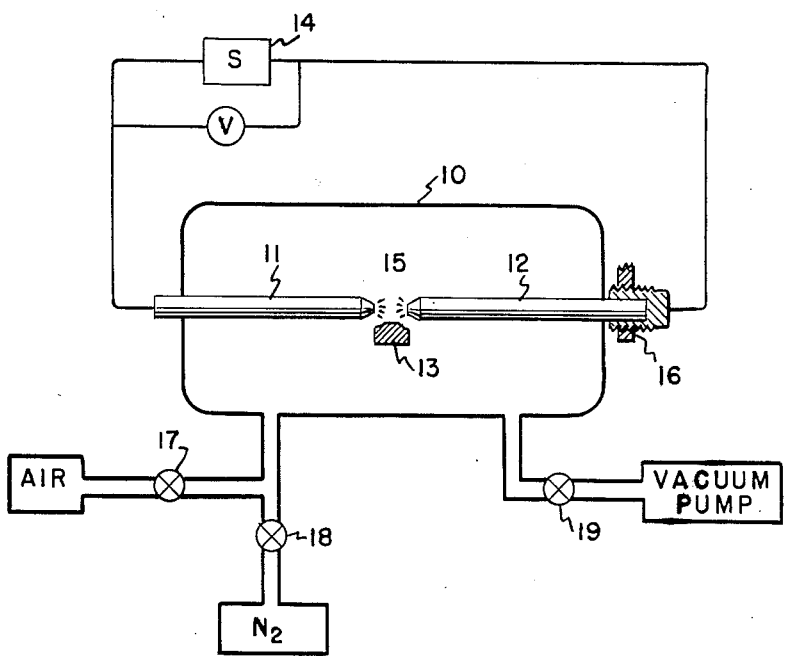

April 21, 1953        M. TIERMAN        2,635,994

PRODUCTION OF CARBON RESISTORS

Filed April 27, 1950

INVENTOR

M. TIERMAN

BY Arthur G. Connolly his ATTORNEY

Patented Apr. 21, 1953

2,635,994

UNITED STATES PATENT OFFICE 2,635,994

PRODUCTION OF CARBON RESISTORS

Melvin Tierman, North Adams, Mass., assignor to Sprague Electric Company, North Adams, Mass., a corporation of Massachusetts Application April 27, 1950, Serial No. 158,350

4 Claims. (Cl. 204—173)

This invention relates to electrical resistance elements and to methods of manufacturing them.

In the past, carbon type resistors have been made by molding mixtures of carbon or graphite and inert binder upon preheated inorganic surfaces. Resistors of this type have also been made by the thermal degradation of hydrocarbon gases on hot nonconducting core material to form tough, so-called "vitreous carbon" film. The former type of resistors are useful only over a limited temperature range and are relatively unstable, while the latter type are difficult to produce in controlled resistance values and require a ceramic or special glass base material because of the high surface temperature to which the base must be heated.

It is an object of this invention to overcome the foregoing and related disadvantages. The primary object of the instant invention is to provide a novel and relatively simple process for producing a suitable carbon film-type resistor having exceptional electrical characteristics. A further object of the invention is the provision of a process which is inherently capable of producing such type resistors with a heretofore unobtainable uniformity in operational characteristic. Still another object of the invention is the provision of a process in which the control operations thereof may be varied expediently to produce resistors of the above type with predetermined predictable temperature coefficients of resistance. Still another object of this invention is to produce carbon type resistors in uniform ohmic values and with predictable temperature coefficients of resistance.

Further objects will become apparent from the description and claims that follow.

These objects are attained in accordance with the present invention wherein there is produced an electrical resistor by condensing a film of carbon from vapors thereof on a non-conducting base. In another form of this invention there is produced an electrical resistor by condensing carbon vapors from a carbon arc on a cooler non-conducting base. In one of the preferred forms of this invention there is produced an electrical resistor by condensing carbon vapors on a non-conducting base from a carbon arc in an atmosphere under reduced pressure.

This invention is further concerned with the above products and processes wherein the base material is selected from the class of refractory ceramics, inorganic glasses and resinous plastic materials. In preferred forms, the base may be a borosilicate glass held at a temperature between about 200° C. and about 500° C., or a polytetrafluoroethylene resin held at a temperature of 300° C. or less.

In its more limited embodiments there is produced in accordance with this invention an electrical resistor by condensing carbon vapors on a non-conducting base from a carbon arc in an atmosphere having a pressure between about one micron and about 50 millimeters of mercury, said base being held at a temperature between about 150° C. and about 1500° C. This invention also pertains to an electrical resistance film on a non-conducting core produced by drawing a carbon arc in air at atmospheric pressure, reducing the pressure to or below 50 millimeters of mercury, and maintaining the arc and substantially removing said oxidizing gas and depositing a carbon film on said core.

The herein disclosed products and processes are new and useful in the electronic and electrical fields.

Figure 2:
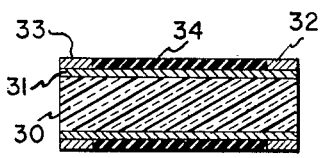
Figure 3:
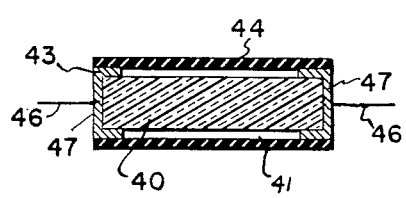

This invention will be further described with reference to the appended drawings in which Figure 1 represents one arrangement whereby the herein disclosed processes may be practiced, Figures 2 and 3 show cross sections of finished resistance elements according to a different embodiment of this invention.

In Figure 1 the apparatus for practicing the process of the invention is primarily housing 10 which may, for example, be glass and in which are two carbon electrodes 11 and 12 together with a non-conducting base material 13. Carbon electrodes 11 and 12 are, as shown, electrically connected to a variable voltage source 14. Opening into the housing are conduits provided with valves 17, 18, 19 for admitting air, and/or an inert gas such as nitrogen, or for at least partially evacuating the housing. An automatic or manual adjustable holder 16 may be used to hold one or both of the arcing electrodes.

In one form of the invention, the base material 13 is provided with electrical leads before insertion into housing 10. A silver paint in the form of paste such as those shown in National Bureau of Standards, Circular 468, pages 5, 6 and 7, may be provided about the ends of base 13 to provide electrically conductive contact coats for the carbon film to be deposited thereon. As indicated in the above publication, some silver paints need not be fused or fired, but fusing or firing may be effected preferably by the arc, or separately if desired. Conductive coats provide convenient sites to which terminal leads may be firmly attached as by soldering.

The base element 13, in some cases, with lead wires, is then inserted in housing 10. Valves 17 and 19 are then opened so that air may enter the housing. Adjusting device 16 is manipulated in order that an arc 15 may be struck between carbon elements 11 and 12. The heat of the arc may be used to pre-heat element 13. Valve 17 is then closed so that a vacuum may be drawn on the system. With the vacuum drawn valve 19 may also be closed. Adjusting device 16 is set so as to maintain the initial arc. In this way a micro-crystalline film of carbon is deposited upon base element 13. When desired, valve 18 may be opened to break the vacuum with an inert gas, such as nitrogen.

Figure 2 shows a cross-section of an element prepared in accordance with one embodiment of the present invention. Non-conducting base material 30 is coated with carbon film 31. The ends of the carbon coated element are provided with low resistance bands 32, 33 to which external electrical contact may be made. The remaining unprotected carbon film is covered with insulating material 34 such as, for example, a polytetrahaloethylene resin.

The carbon film over the end caps may be removed as by abrasion, if it interferes with the final sealing.

Figure 3 shows a different type of construction in which conductive caps 47, such as silver coatings on both ends of a cylindrical base 40, and the carbon coating 41 of the invention is deposited afterward. The coated unit is then inserted in a dielectric protective sleeve 44 such as glass, which is fused to the caps to hermetically seal the unit. Leads 46 can be soldered to the caps.

The value of resistance obtained in accordance with the herein disclosed processes will vary with the voltages, temperatures, and times employed in each of the required steps. The nature and cleanliness of the base material used will also govern to some extent the ohmic values obtained.

With the above equipment, typical resistors were made as follows:

A heat-resistant boro-silicate (Pyrex) glass rod having a diameter of 3 mm. was pre-heated in an air (oxidizing) atmosphere with an arc drawn at 30 volts for 15 seconds. After this period, the air was evacuated to a pressure of 50 microns of mercury and carbon began to deposit on the base material. The arc was held at 20 volts under a pressure of 50 microns of mercury for 60 additional seconds and the electric circuit was then switched off and the housing permitted to cool to about room temperature. The resulting coated base, which was removed from the housing after opening the housing to the air, has a resistance of $1 \times 10^{13}$ ohms across a deposit of 6 mm. in length.

Similarly, another resistor was made with the same boro-silicate glass rod which was pre-heated in a sealed-in air atmosphere with an arc drawn at 30 volts for 15 seconds. Thereafter without the application of my external suction, a carbon film condensed upon the base material. With a deposition time of 45 seconds and an arc voltage of 23 volts, the final unit has a resistance of $1 \times 10^{10}$ ohms across a deposit 6 mm. in length.

Furthermore, a rod of polytetrafluoroethylene resin (see below) 3 mm. in diameter was inserted in the described apparatus which was then evacuated to a pressure of 50 microns of mercury. The carbon arc was struck and maintained at 25 volts for 15 seconds during which time the polytetrafluoroethylene base material was coated with a carbon film deposited from the arc. The completed element had a measured resistance of about $1 \times 10^{13}$ ohms with a film 6 mm. in length.

The deposition of carbon in accordance with the present invention may also be effected at pressures below 1 micron of mercury, and above 50 millimeters of mercury. Atmospheric or even higher pressures may be used.

Base materials suitable for use in accordance with this invention include glasses such as boro-silicate glass and lead glass; ceramics; quartz; or resins such as polytetrahaloethylene, silicones, alkyd-type polyesters, polyethoxylenes, condensation resins such as the phenol-formaldehyde types, etc. Polytetrafluoroethylene, the properties and preparation of which are disclosed in Plunket U. S. Patent No. 2,230,654 and Industrial and Engineering Chemistry, September 1946, pages 871–877, is a preferred material.

Finished units of the type herein disclosed may be sealed with an insulating material such as, for example, polytetrahaloethylene resins, silicone, glass or the like. Such external coatings or casings stabilize the unit against humidity and damage from external sources. If a pre-formed tubular casing of polytetrafluoroethylene or a similar resin is employed to encase the unit the ends of the casing may be fused to complete the end seal. Alternatively, the unit may be end sealed by means of end caps, sealing cements, or the like. If silicone casings, or the like, are desired, the units may be dipped in uncured fluid or powdered resinous material after which the dip coating may be polymerized in situ to form a tough protection casing about the resistor unit. The carbon coated elements may be sealed in a nitrogen or other gaseous atmosphere to further stabilize the resistance element. Variations in resistance value may be achieved through spiral cutting of the core with a diamond die or other cutting device, depending upon the nature of the base material.

A particular advantage of the resistance elements produced herein resides in their thermal stability. Where desired, silver enamel and related coatings may be fired on or otherwise applied as surface layers to provide terminal layers upon the element for receiving soldered or fired-on connecting leads.

It will be noted in the experiments described that the process of the invention may optionally include a pre-treatment of the base material by the arc in an oxidizing atmosphere. This removes by oxidation any extraneous conducting materials that may contaminate the base and also serves as a means for controlling the process time. The arc may be struck and adjusted to the proper intensity prior to deposition on the base material. Oxygen in the housing oxidizes any carbon vapors that would be formed by the arc and is used up in the process so that the onset of the deposition is somewhat delayed.

As indicated previously it is possible to form very stable resistance elements even on resin surfaces. Heretofore, the most stable form of carbon used for resistance elements, namely "vitreous carbon," has necessarily required a very hot ceramic surface the high temperature of which was relied on to decompose molecules of organic material and form the carbon. As a result, the resistance of the finished unit has a temperature variation which depends upon the thermal coefficients of expansion of the ceramic base. These generally fall within a narrow range and the overall temperature coefficient of resistance is correspondingly limited to a fairly narrow range. By my invention which includes numerous inorganic and organic surfaces, a wide range of thermal coefficients of expansion are possible and resistors within a broad range of temperature coefficients may be fabricated. For example, a resistor of the invention, produced on a polytetrafluoroethylene base will normally possess a positive temperature coefficient of resistance (decrease in resistance with increase of temperature) in contrast to the negative coefficient obtained with vitreous carbon resistors.

It should be understood that the pre-heating in an oxidizing atmosphere may be eliminated in the instances wherein organic resins are employed. Likewise, the temperature of the base surface may be varied within wide limits—generally between about 150° C. and about 400° C. in the case of organic resins and between about 200° C. and about 1500° C. in the case of inorganic bases. Glass is usually employed with a surface temperature between about 200° C. and 500° C.

The process of the invention is ideally suited to semi-continuous manufacturing operations. For example, a roll of polytetrafluoroethylene or woven glass string may be placed in the vacuum chamber and run through the vapor area at a constant rate to form a continuous length of resistance element. This may subsequently be chopped into appropriate lengths and provided with terminal elements.

The continuous coating process may be effected with a housing that has suitable fluid seals at the entrance and exit. Mercury seals in the form of U-traps filled with mercury are highly effective for this purpose.

The base on which the carbon is deposited in accordance with the present invention may be cylindrical, flat or ribbonlike, rectangular or polygonal in cross section, or in any other desired form.

The present invention is suited to fully continuous manufacturing operations. For example, the coating chamber may be provided with openings that fit snugly about the non-conducting base material, but permit the movement of a continuous strip or rod of base material therethrough. In this modification, the chamber is preferably maintained with an inert gas at close to atmospheric pressure so as to reduce the passage of gas through the entrance and exit seals. The deposition process would then be carried out in said inert gaseous atmosphere. The so coated elongated strip or rod may subsequently be chopped or cut into appropriate lengths and provided with terminals such as encircling conductive clamps or the conductive paints described above.

As many apparently widely different embodiments of the invention may be made without departing from the spirit and scope hereof, it is to be understood that the invention is not limited to its specific embodiments except as defined in the appended claims.

What is claimed is:

1. A process for producing a stable carbon type of resistor having uniform ohmic values and predictable temperature coefficients of resistance on a non-conductive solid base material which is inert to temperatures at least as high as 150° C., which comprises, preheating said base to a temperature of at least 150° C. in an oxidizing atmosphere to remove extraneous surface matter by oxidation, exposing said preheated base to a carbon arc in a carbon arc chamber having an inert atmosphere to cause a thin resistance layer of pure carbon to deposit upon said base, the temperature of said base affecting the rate of deposition of said carbon layer, cooling said so coated base, attaching electrical terminal leads to opposed extremities of said carbon deposit, and encasing said so-coated base in a protective material.

2. A process for producing a carbon resistor which process comprises providing an electrically non-conductive solid base inert to temperatures at least as high as 150° C., preheating the base in an oxidizing atmosphere to at least 150° C. and within the range of temperatures in which it is inert, to prepare the surface for the deposition of carbon by oxidizing surface contaminants, and then exposing the preheated base to a carbon arc in an inert atmosphere to cause a layer of carbon to deposit from the arc as a coating on the exposed surface of the base, cooling the coated base and attaching electrical connection leads to spaced portions of the coating.

3. The process of claim 2 in which the base is polymerized tetrafluoroethylene.

4. The process of claim 2 in which the base is a borosilicate glass.

MELVIN TIERMAN.

References Cited in the file of this patent

UNITED STATES PATENTS

| Number | Name | Date |
|---|---|---|
| 395,963 | Edison | Jan. 8, 1889 |
| 568,323 | Acheson | Sept. 29, 1896 |
| 679,926 | Voelker | Aug. 6, 1901 |
| 1,881,445 | Flanzer et al. | Oct. 11, 1932 |
| 1,987,969 | Parkin | Jan. 15, 1935 |
| 2,057,431 | Hobrock | Oct. 13, 1936 |
| 2,330,782 | Morelock | Sept. 28, 1943 |
| 2,392,389 | Joyce | Jan. 8, 1946 |

OTHER REFERENCES

Publication: Du Pont, Technical Service Bulletin No. 13, April 1, 1949, "Teflon."